US006863481B2

(12) United States Patent
Pingel

(10) Patent No.: US 6,863,481 B2
(45) Date of Patent: Mar. 8, 2005

(54) WHEEL CHOCK MOUNTING PLATE ASSEMBLY

(75) Inventor: Wayne Pingel, Adams, WI (US)

(73) Assignee: Pingel Enterprise, Inc., Adams, WI (US)

( * ) Notice: Subject to any disclaimer, the term of this patent is extended or adjusted under 35 U.S.C. 154(b) by 4 days.

(21) Appl. No.: 10/623,995

(22) Filed: Jul. 21, 2003

(65) Prior Publication Data

US 2005/0019126 A1   Jan. 27, 2005

(51) Int. Cl.$^7$ ................................................ B60P 3/077
(52) U.S. Cl. ........................ 410/30; 410/9; 414/462; 224/924
(58) Field of Search ........................... 410/3, 7–12, 19, 410/30; 188/32; 414/462; D12/217; 224/537, 571, 924

(56) References Cited

U.S. PATENT DOCUMENTS

| 1,733,269 A | 10/1929 | Mauk et al. |
| 3,357,639 A | 12/1967 | Peterson |
| 4,492,403 A * | 1/1985 | Blomgren et al. ............ 410/30 |
| 4,815,638 A | 3/1989 | Hutyra |
| 5,011,347 A | 4/1991 | Bullock |
| 5,160,223 A | 11/1992 | Seitz |
| D. 386,140 S | 11/1997 | Pingel et al. |
| D. 386,141 S | 11/1997 | Pingel et al. |
| D. 397,983 S | 9/1998 | Pingel et al. |
| D. 397,984 S | 9/1998 | Pingel et al. |
| D. 397,985 S | 9/1998 | Pingel et al. |
| 5,803,208 A | 9/1998 | Blach |
| 6,227,512 B1 | 5/2001 | Andre et al. |
| 6,331,094 B1 | 12/2001 | Burrows |
| 6,524,053 B2 | 2/2003 | Hahn et al. |
| 2003/0082034 A1 | 5/2003 | Barrett |

* cited by examiner

Primary Examiner—D. Glenn Dayoan
Assistant Examiner—Paul Chenevert
(74) Attorney, Agent, or Firm—Lathrop & Clark LLP

(57) ABSTRACT

A wheel chock mounting plate assembly that can be easily attached to and removed from the load surface of a trailer or other transporting vehicle. The wheel chock mounting plate assembly attaches to a logistic track, standard in the field of cargo control systems, that is fixed to the load surface. The wheel chock mounting plate is precisely drilled and machined to receive a wheel chock. The mounting plate assembly has a fitting adapted to engage the logistic track attached with a logistic strap to the rear end of the mounting plate. At least one longitudinally slideable key is adapted to extend below the mounting plate to fit in a transverse opening of the logistic track to prevent the mounting plate from moving in a direction transverse to the length of the logistic track. The front of the mounting plate has a fitting adapted to engage the logistic track and secure the mounting plate assembly in the longitudinal direction of the logistic track.

21 Claims, 5 Drawing Sheets

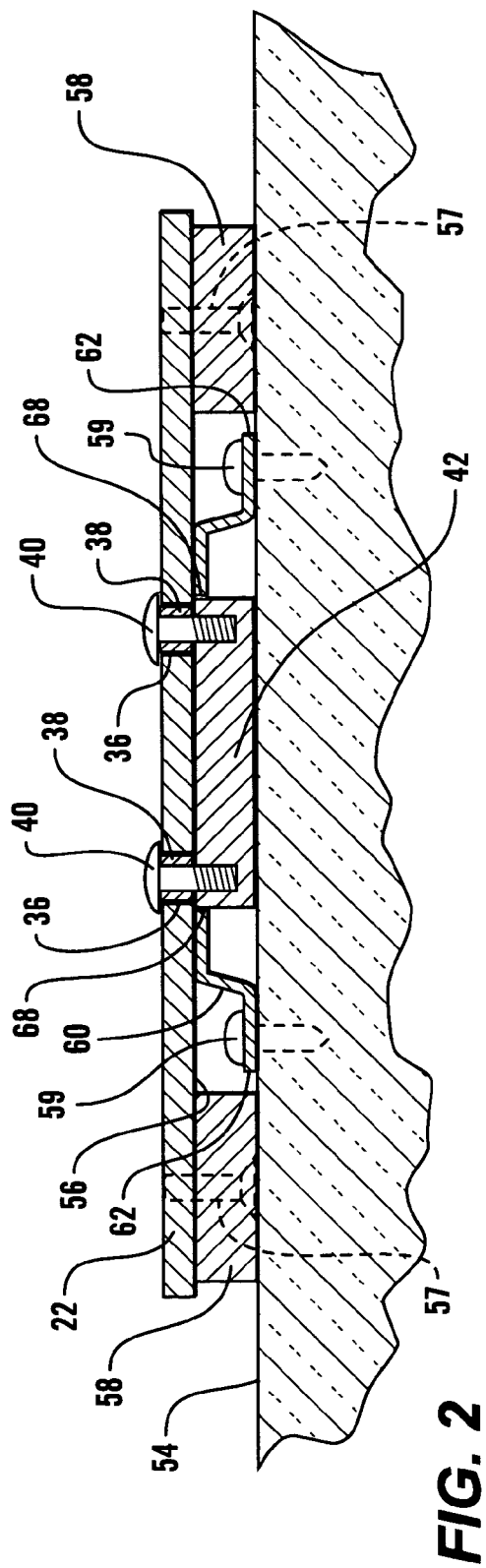
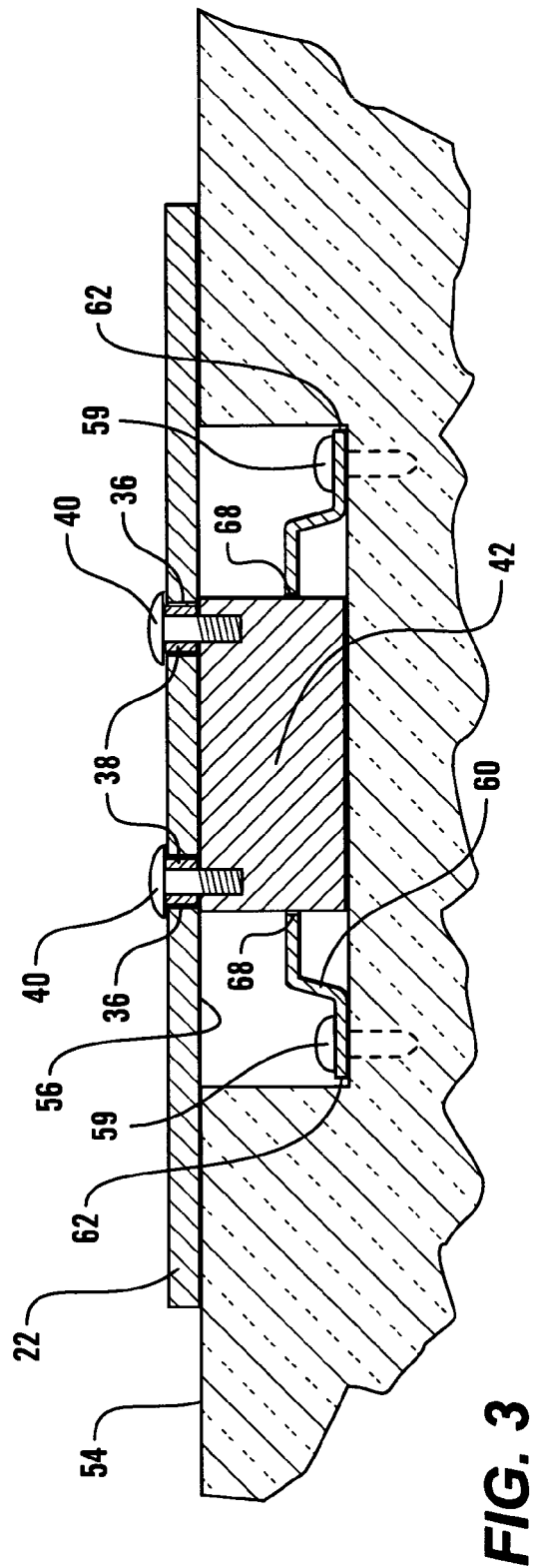
FIG. 2
FIG. 3

WHEEL CHOCK MOUNTING PLATE ASSEMBLY

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates generally to devices to secure wheel chocks onto the load surface of a transporting vehicle. More particularly this invention relates to a removable wheel chock mounting plate assembly used to mount wheel chocks to the load surface of a transporting vehicle.

The ability to transport motorcycles and other motorized vehicles is necessary for a wide variety of reasons. Whether needed for racing, hunting, or purely recreational riding, it is typically desirable to transport these vehicles to the riding site thereby enabling the driver to bring more equipment or people with the vehicle. The vehicles must be secured and restrained to a transporting vehicle, typically a trailer or pickup truck cargo bed. A variety of wheel chocks have been developed for immobilizing the wheels of these vehicles and providing a structure against which the transported vehicle may be strapped or braced in stable relation. The wheel chocks are usually attached to the load surface of a transporting vehicle.

Wheel chocks may be fastened directly to the load surface of a transporting vehicle most typically a trailer. However, there are two potential problems with this type of mounting. First, the wheel chock is a relatively permanent fixture on the surface of the trailer impeding the use of the trailer for other purposes. Either the trailer can only be used for transporting the specific vehicle the wheel chock was mounted for, or the load must be distributed around the wheel chock. Second, the wheel chock may be removed but that usually entails the difficulty of removing screws or other fasteners, sometimes resulting in holes in the surface of the trailer, or leaving limited purpose hardware attached to the surface of the trailer. To alleviate these problems, wheel chock mounting plates have been developed.

Wheel chock mounting plates are normally secured to the surface of a trailer. The wheel chocks are fitted with hardware adapted to removably secure the wheel chock to the mounting plate. Typically this hardware includes lugs that slide into slots on the mounting plate, or the mounting plate provides the lugs and the hardware the slots. In any case, the wheel chock is easily slid in a direction to disengage the lugs from the slots and remove the wheel chock from the surface of the trailer. However, the problem of hardware, including one or more mounting plates, remaining fixed to the surface of the trailer still exists.

What is needed is a wheel chock mounting assembly that facilitates easy attachment to and removal of a wheel chock from the surface of a trailer or other transporting vehicle without limited purpose hardware remaining fixed to the trailer that impedes other uses of the trailer.

SUMMARY OF THE INVENTION

The wheel chock mounting plate assembly of this invention provides a mounting plate that can be easily attached to and removed from the load surface of a trailer or other transporting vehicle. The mounting plate assembly attaches to a logistic track, standard in the field of cargo control systems, that is fixed to the load surface. The wheel chock mounting plate is precisely drilled and machined to receive a wheel chock. The mounting plate assembly has a fitting adapted to engage the logistic track attached with a strap to the rear end of the mounting plate. At least one longitudinally slideable key is adapted to extend below the mounting plate to fit in a transverse opening of the logistic track to prevent the mounting plate from moving in a direction transverse to the length of the logistic track. The front of the mounting plate has a fitting adapted to engage the logistic track and secure the mounting plate assembly in the longitudinal direction of the logistic track.

It is an object of the present invention to removably secure a wheel chock to the surface of a transporting vehicle.

It is another object of the present invention to facilitate easy attachment and removal of a wheel chock to the surface of a transporting vehicle.

It is also an object of the present invention to attach the wheel chock mounting plate assembly to a logistic track that is fixed to a transporting vehicle such that when the wheel chock mounting plate assembly is removed from the trailer, the only hardware left behind on the transporting vehicle is the logistic track which does not impede the use of the trailer for other purposes and can be used to secure other types of cargo.

Further objects, features and advantages of the invention will be apparent from the following detailed description when taken in conjunction with the accompanying drawings.

BRIEF DESCRIPTION OF THE DRAWINGS

FIG. 2 is a cross sectional view of the mounting plate assembly of FIG. 1, taken along section line 2—2 thereof.

FIG. 3 is a cross sectional view taken along the same section line as FIG. 2 but showing a modified embodiment of the wheel chock mounting plate assembly adapted to engage a logistic track embedded in the load surface of the transporting vehicle.

DESCRIPTION OF THE PREFERRED EMBODIMENTS

Figure 1:
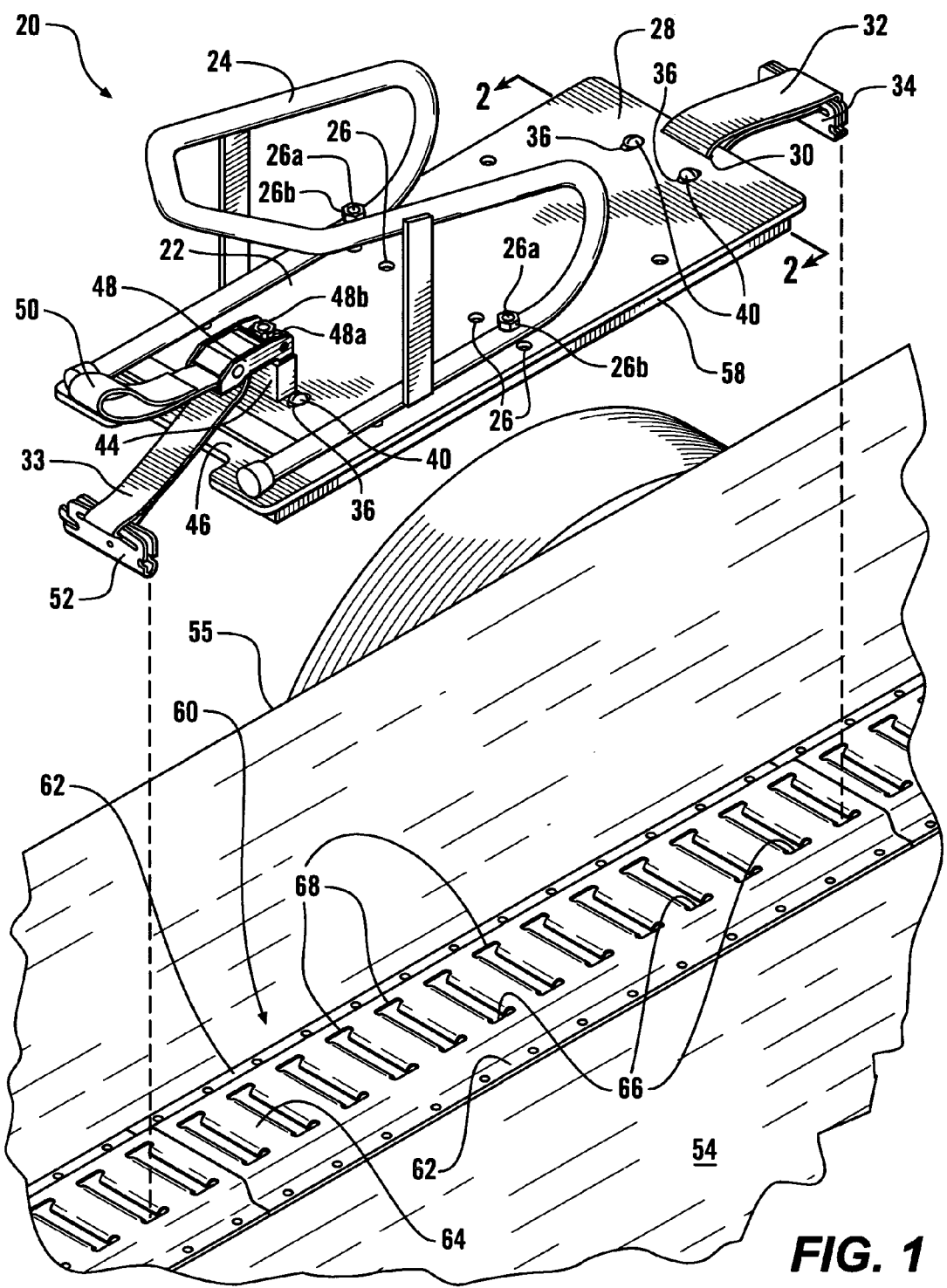
FIG. 1 is an isometric view of a preferred embodiment of the invention with the wheel chock mounting plate assembly detached from the logistic track.

Referring more particularly to FIG. 1, there is shown a preferred embodiment of a wheel chock mounting plate assembly 20 in accordance with the present invention detached from a conventional Series E logistic track 60. The wheel chock mounting plate assembly 20 has a mounting plate 22. The mounting plate 22 is preferably precisely drilled and machined to receive a selected wheel chock 24, a device used to secure and restrain the wheel of a motorized vehicle. The mounting plate 22 preferably has several bolt holes 26 so that wheel chocks of differing shapes and sizes may be attached. The wheel chock 24 shown is one of a variety that may be bolted to the mounting plate 22. The bolt holes 26 are preferably countersunk in the bottom surface 56 of the mounting plate 22 so that flat head bolts or machine screws 26a and lock nuts 26b may preferably be used to secure the wheel chock 24 on the mounting plate 22.

The rear end 28 of the mounting plate 22 preferably has a slot 30 that runs in a direction transverse to the length of the mounting plate 22. A flexible logistic strap 32 tension means is fed through the slot 30 and attached to itself in loop form to secure the logistic strap 32 to the mounting plate 22. The logistic strap 32 may also be attached, as shown, to a conventional logistic track fitting 34. Any suitable fitting adapted to engage and secure a logistic strap to a selected logistic track can be used. For example, the fitting shown is a "Series E 3-piece Fitting" sold by Kinedyne Corporation. This fitting is preferred for the rear end logistic strap 32 attachment because it presents a low profile while engaged in the logistic track. Being at the rear end 28 of the mounting plate assembly 20, the wheel of the vehicle being transported must be rolled over this fitting to engage the wheel against the wheel chock 24. Therefore, a fitting with a low profile provides a smaller obstruction to overcome while loading. Logistic track fittings are commercially manufactured and sold by many companies and any such fitting appropriate for the selected logistic track may be used. Additionally, while standard logistic straps used to secure many types of loads are preferred for affixing the logistic track fittings to the mounting plate, any flexible strap or other tension means with limited resilience may be used and all such items are referred to herein generally as a "logistic strap."

At least one key 42 is attached to the underside of the mounting plate 22, and fits into a logistic track opening 66 to thereby restrain movement of the mounting plate assembly 20 in a direction transverse to the longitudinal axis of the logistic track 60. Preferably, the mounting plate 22 has a plurality of slots 36 extending longitudinally therein. As shown in FIG. 2, the slots 36 accommodate spacers 38 and screws 40 that attach a key 42 to the bottom surface 56 of the mounting plate 22. The key 42 has a transverse length slightly shorter, by a few thousandths of an inch, than the transverse dimension of the selected logistic track openings 66. A plurality of such keys 42 may be attached to the mounting plate 22, and the embodiment of FIG. 1 has two. Because of their transverse length, these keys 42 restrain the movement of the mounting plate 22 in a direction transverse to the longitudinal axis of the logistic track 60. As shown in FIG. 2, the spacers 38 are slightly taller than the thickness of the mounting plate 22. Therefore, when the screws 40 are tightened into the key 42, the top of the key 42 will be spaced slightly below the bottom surface 56 of the mounting plate 22. This allows the keys 42 to move in the longitudinal direction of the mounting plate 22 the length of the slots 36. The screws 40 are prevented from moving within the slots 36 in a direction transverse to the longitudinal axis of the mounting plate 22 due to the width of the slots 36 being only slightly wider than the diameter of the spacers 38.

Alternatively, the screws 40 may have a shoulder slightly longer than the thickness of the mounting plate 22 extending between the screw head and the threaded portion of the screw such that when the screws 40 are tightened into the key 42, the top of the keys 42 will be spaced slightly below the bottom surface 56 of the mounting plate 22. This allows the keys 42 to move in the longitudinal direction of the mounting plate 22 the length of the slots 36 and eliminates the need for the separate spacers 38. The screws 40 are prevented from moving within the slots 36 in a direction transverse to the longitudinal axis of the mounting plate 22 due to the width of the slots 36 being only slightly wider than the diameter of the shoulder on the screws 40.

The keys 42 are shown with simple rectangular shapes that extend substantially the full transverse length of the selected logistic track openings 66 into which they extend. However, any shape is suitable as long as the key 42 extends for substantially the entire transverse length of the selected logistic track opening 66 to prevent any significant transverse movement of the wheel chock mounting plate assembly 20 with respect to the logistic track 60.

As shown in FIG. 1, a cam block 44 is secured to the front end 46 of the mounting plate 22. A cam buckle 48 is preferably attached to the top of the cam block 44. The cam block 44 and cam buckle 48 may preferably be secured to the mounting plate 22 by screws 48a extending from beneath the mounting plate 22, in the same manner as screws 26a, and by locknuts 48b. The cam buckle 48 may be any device through which a logistic strap may be pulled in one direction that restrains the logistic strap from being released in the opposite direction until the device is disengaged. The cam buckle 48 shown is a standard cam buckle used with logistic straps to secure cargo, as manufactured by Kinedyne Corporation. While a cam buckle is a particularly convenient device to restrain and secure the preferred logistic strap, any device or apparatus, including a ratchet buckle, that will restrain and secure a selected logistic tie down strap or other suitable tension means may be used.

As further shown in FIG. 1, a flexible front logistic strap 33 is deployed through the cam buckle 48. The free end of the front logistic strap 33 is looped and attached to itself to provide a handle 50 with which to pull the front logistic strap 33. The other end of the front logistic strap 33 is attached to a logistic track fitting 52. Any fitting adapted to engage and secure a logistic strap to a selected logistic track can be used. For example, the fitting shown is a "Series E Spring-Loaded Fitting," sold by Kinedyne Corporation, which is preferred for its convenience.

As shown in FIGS. 1 and 2, the logistic track 60 is mounted on the load surface 54 of the transporting vehicle 55. In the embodiment shown, the bottom surface 56 of the mounting plate 22 rests on the top surface of the logistic track 60. Side spacer bars 58, having a thickness substantially equal to the height of the selected logistic track 60 above the load surface 54, may be attached to the underside of the mounting plate 22, preferably by flathead screws 57. As shown in FIG. 2, the spacer bars 58 extend from the bottom surface 56 of the mounting plate 22 to the load surface 54 so that the mounting plate 22 cannot tip or otherwise rotate about the longitudinal axis of the logistic track 60. Alternatively, the logistic track 60, shown in FIG. 3, is embedded in the load surface 54 of the transporting vehicle (not otherwise shown). Here, the side spacer bars are unnecessary as the bottom surface 56 of the mounting plate 22 rests directly on the load surface 54.

As shown in FIG. 1, the logistic track 60 is a metal track with two side flanges 62 that may be used to secure the track to any load surface using screws, rivets, or welding. For example, FIGS. 2 and 3 show the logistic track 60 attached to the load surface 54 using screws 59. The logistic track 60 has a raised center section 64 containing a plurality of longitudinally spaced rectangular openings 66 positioned so the length dimensions of the openings 66 extend in a direction transverse to the longitudinal axis of the logistic track 60. The openings 66 are formed such that the thickness of the track provides an edge margin 68 on the transverse sides of the rectangular openings 66 as shown in FIGS. 1, 2, 3, 5, and 7. Any conventional "Series E Track", "Series A Track," or other generally similar logistic track may be used. As an example, the logistic track shown in FIGS. 1-3 and 5-7 is a "Series E Track Horizontal" manufactured by Kinedyne Corporation.

The logistic track 60 may be attached to the load surface 54 of the transporting vehicle 55 as shown in FIGS. 1 and 2, or it may be embedded in the load surface 54 as shown in FIG. 3. When the logistic track 60 is so embedded, the keys 42 are made deeper, as shown in FIG. 3, than the key 42 shown in FIG. 2, to accommodate the greater distance between the bottom surface 56 of the mounting plate 22 and the logistic track opening 66. However, the embedded logistic track 60 may have its center section 64 at or closely below the level of the normal load surface 54, depending upon the depth to which the side flanges 62 are embedded. The keys 42 should be of a depth selected to engage the logistic track openings 66 as described.

To attach the wheel chock mounting plate assembly 20 to the logistic track 60 for the embodiment shown in FIG. 1, the rear fitting 34 is first engaged in a logistic track opening 66. Next, the mounting plate assembly 20 is moved forward increasing the tension in the rear logistic strap 32 until the logistic strap 32 is as taut as possible while allowing the key 42 attached to the rear end 28 of the mounting plate 22 to fit into a logistic track opening 66. The key 42 attached to the mounting plate front 46 is adjusted longitudinally such that it fits into another logistic track opening 66. At this point, the mounting plate assembly 20 is resting on the load surface 54 of the transporting vehicle 55 and the top of the logistic track 60 as shown in FIG. 2, or, if the logistic track 60 is embedded in the load surface 54 as shown in FIG. 3, only on the load surface 54.

Once the rear fitting 34 and the keys 42 are engaged in the logistic track openings 66, the front fitting 52 is engaged in a logistic track opening 66 forward of the mounting plate front 46. The cam buckle 48 may be disengaged if necessary to allow the flexible front logistic strap 33 to be released through the cam buckle 48 to provide slack in the front logistic strap 33 to permit the front fitting 52 to be easily engaged in a logistic track opening 66. Once the front fitting 52 is engaged in the logistic track opening 66, the logistic strap handle 50 may be pulled and the cam buckle 48 engaged to tension the front logistic strap 33 and, since the keys 42 are longitudinally slideable, the rear logistic strap 32 as well. This secures the mounting plate assembly 20 in fixed position along the longitudinal axis of the logistic track 60. The keys 42, as shown in FIGS. 2 and 3, likewise prevent the mounting plate 22 from moving in a direction transverse to the longitudinal axis of the logistic track 60. Thus, the wheel chock mounting plate 22 is securely attached to the load surface of a transporting vehicle and prepared to receive the wheel of a motorized vehicle, which is maintained against the wheel chock 24 in any conventional manner such as forwardly extending logistic strap tie downs.

To remove the mounting plate assembly 20 from the load surface 54 of the transporting vehicle 55 the cam buckle 48 may be disengaged to release the front logistic strap 33 to thereby relieve tension in the front logistic strap 33 and to allow the front fitting 52 to be disengaged from the logistic track opening 66. The mounting plate assembly 20 can then be removed from the load surface 54 by lifting the entire mounting plate assembly 20 off the transporting vehicle 55 and disengaging the rear fitting 34 from the logistic track opening 66.

Figure 4:
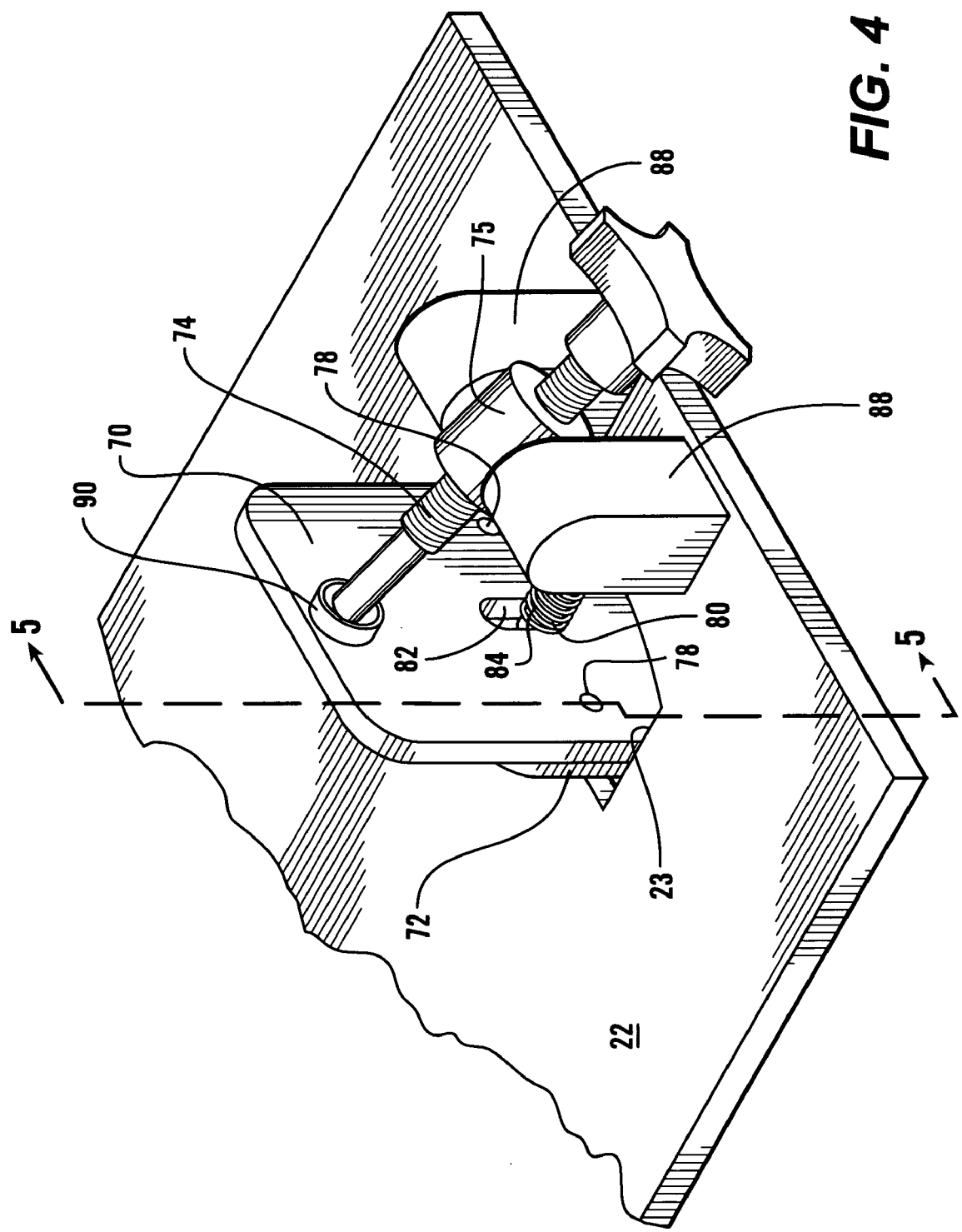
FIG. 4 is an isometric view of an alternate embodiment of the invention.
Figure 5:
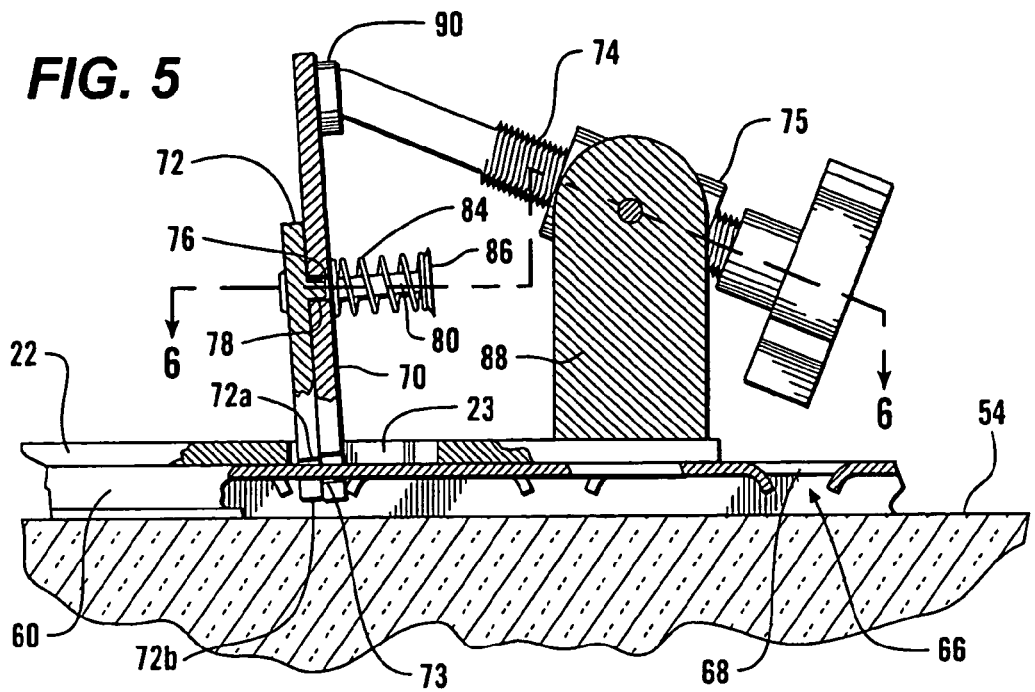
FIG. 5 is a cross sectional view of the mounting plate assembly of FIG. 4, taken along the offset section line 5—5 thereof and showing the embodiment of FIG. 4 engaged on a logistic track.
Figure 6:
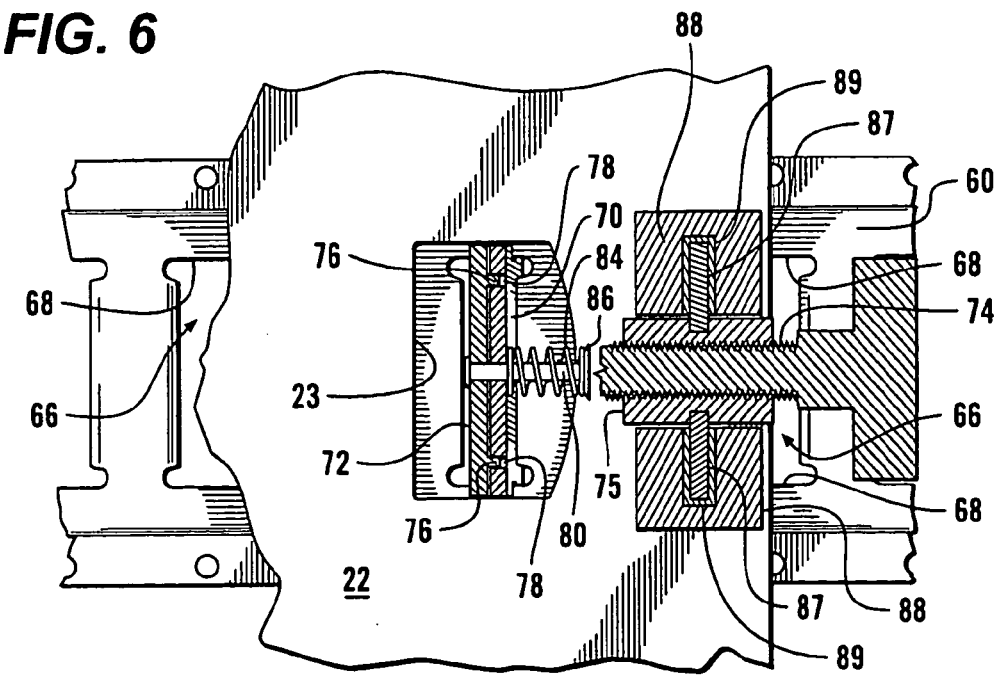
FIG. 6 is a cross sectional view of the mounting plate assembly of FIG. 5, taken along the offset section line 6—6 thereof.

An alternative embodiment of the present invention shown in FIGS. 4-6 replaces the front fitting 52 and front logistic strap 33 with a front gripping plate 70 and preferably a second gripping plate 72 extending through an opening 23 in the mounting plate 22, and being biased into a locking engagement on the logistic track 60 by a force means, preferably, a threaded rod 74. Any force means, attachable to the mounting plate 22, for applying a force to the gripping plates 70 and 72 to bias them into a locking engagement on the logistic track 60 may be used.

The front gripping plate 70 is transversely longer than the logistic track openings 66 and has notches 73 extending transversely into the front gripping plate 70 on each side with lower facing edges. The notches 73 are positioned on the front gripping plate 70 to engage the transverse edge margins 68 of the logistic track openings 66. At least one of the notches 73 extends a sufficient distance into the front gripping plate 70 in a direction transverse to the longitudinal axis of the logistic track 60, such that the distance from the margin of the front gripping plate 70 defining the vertical side of the notch 73 to the opposite side of the front gripping plate 70 is less than or equal to the transverse dimension of the logistic track opening 66. The rear gripping plate 72 is preferably "T" shaped, having a top portion with a transverse dimension approximately equal to that of the front gripping plate 70, shoulders 72a formed where the transverse dimension of the rear gripping plate 72 decreases, and a lower key tab portion 72b, having a transverse dimension just slightly less than the transverse dimension of a logistic track opening 66.

As shown in FIGS. 5 and 6, the gripping plates 70 and 72 preferably have pins 76 that extend from the rear gripping plate 72 into locator holes 78 in the front gripping plate 70. A retaining rod 80, fixed to the rear gripping plate 72, extends through a vertical slot 82 in the front gripping plate 70. As shown in FIG. 5, a compression spring 84 around the retaining rod 80 is compressed between the front gripping plate 70 and the removable head portion 86 of the retaining rod 80 to bias the gripping plates 70 and 72 together.

Additionally, the head portion 86 may be pushed toward the rear gripping plate 72, while holding the front gripping plate 70 stationary, causing the rear gripping plate 72 to move backwards from the front gripping plate 70 and the pins 76 to disengage from the locator holes 78. The rear gripping plate 72 may be slid upwards relative to the front gripping plate 70 the length of the vertical slot 82. The rear gripping plate 72 has a vertical dimension that allows the bottom of the rear gripping plate 72 to become level with the tops of the notches 73 when the rear gripping plate 72 is slid upwards, and allows the key tab portion 72b of the rear gripping plate 72 to extend into the logistic track opening 66 when the pins 76 are engaged in the locator holes 78 and the notches 73 are engaged with the transverse edge margins 68. This movement of the rear gripping plate 72 facilitates engaging and disengaging the notches 73 of the front gripping plate 70 with the transverse edge margins 68 of the logistic track opening 66.

The embodiment of FIGS. 4-6 is deployed by first engaging the gripping plates 70 and 72 in a logistic track opening 66. This is accomplished by separating the gripping plates 70 and 72 as described above and sliding the rear gripping plate 72 upwards so the bottom of the rear gripping plate 72 is at a level with or above the tops of the notches 73 in the front gripping plate 70. Preferably, the gripping plates 70 and 72 are then slightly rotated about the axes normal to their surfaces such that the longer notch 73 will engage a transverse edge margin 68 of the logistic track opening 66. The gripping plates 70 and 72 should be moved in a direction transverse to the longitudinal axis of the logistic track 60 to position the transverse edge margin 68 into the engaged notch a large enough distance such that the gripping plates may be rotated about the axes normal to their surfaces in the opposite direction to allow the other notch 73 engage the opposite transverse edge margin 68 of the logistic track opening 66.

Next, the gripping plates 70 and 72 may be moved in a direction transverse to the longitudinal axis of the logistic track 60 to a position such that the key tab portion 72b of the rear gripping plate 72 may then be slid downwards into the logistic track opening 66 so the pins 76 are at a level with the locator holes 78 and the retaining rod 80 may be released to allow the pins 76 to engage the locator holes 78 and the compression spring 84 to bias the gripping plates 70 and 72 together.

The gripping plates 70 and 72 are now deployed on the logistic track 60 such that they are generally perpendicular to the longitudinal axis of the logistic track 60 and both notches 73 of the front gripping plate 70 and the shoulders 72a of the rear gripping plate 72 are engaged with the transverse edge margins 68. Further, the key tab 72b of the rear gripping plate 72 is engaged in the logistic track opening 66 and restrains movement of the gripping plates 70 and 72 in a direction transverse to the longitudinal axis of the logistic track 60.

The rear fitting 34 may next be engaged in the appropriate track opening 66 and the mounting plate assembly 20 moved forwardly to snug up the rear logistic strap 32 and position the rear key 42 in an appropriate logistic track opening 66. The logistic track opening 66 in which the rear fitting 34 is engaged should be chosen such that when the mounting plate assembly 20 is lowered onto the logistic track 60 or load surface 54, the gripping plates 70 and 72 extend through the opening 23 in the mounting plate 22. Next the threaded rod 74 may be engaged with the front gripping plate 70 to bias the gripping plates 70 and 72 into a locking engagement on the logistic track 60.

The threaded rod 74 is rotationally mounted in a swing block 75, which in turn is pivotally mounted between two side blocks 88 fixedly attached to the top surface of the mounting plate 22, and is further engageable in a socket joint 90 attached to the front surface of the front gripping plate 70. In the embodiment shown in FIG. 5, the swing block 75 is preferably pivotally mounted by means of two axles 87 that are press fit into the swing block 75 and friction fit using bearings 89 in the side blocks 88.

By turning the threaded rod 74 into the swing block 75, the threaded rod 74 may be forced into the socket joint 90 which in turn causes the gripping plates 70 and 72 to form an acute angle with the plane of the logistic track 60. This causes the lower facing edges of the notches 73 in the front gripping plate 70 and the facing edges of the shoulders 72a to engage the transverse edge margins 68 of the logistic track opening 66 in opposing fixed relation and secure the mounting plate assembly 20 on the logistic track 60 in a longitudinal direction. At the same time, the key tab 72b of the rear gripping plate 72 acts to restrain movement of the mounting plate assembly 20 in a direction transverse to the longitudinal axis of the logistic track 60 to thereby take the place of a key 42.

The embodiment of FIGS. 4-6 is detached from the logistic track 60 by first turning the threaded rod 74 to disengage it from the socket joint 90. The mounting plate assembly 20 is lifted off the logistic track 60 and the rear fitting 34 is disengaged from the logistic track opening 66. The gripping plates 70 and 72 are then removed from the logistic track 60 by reversing the procedure used to attach the gripping plates 70 and 72 to the logistic track 60 as described above.

Figure 7:
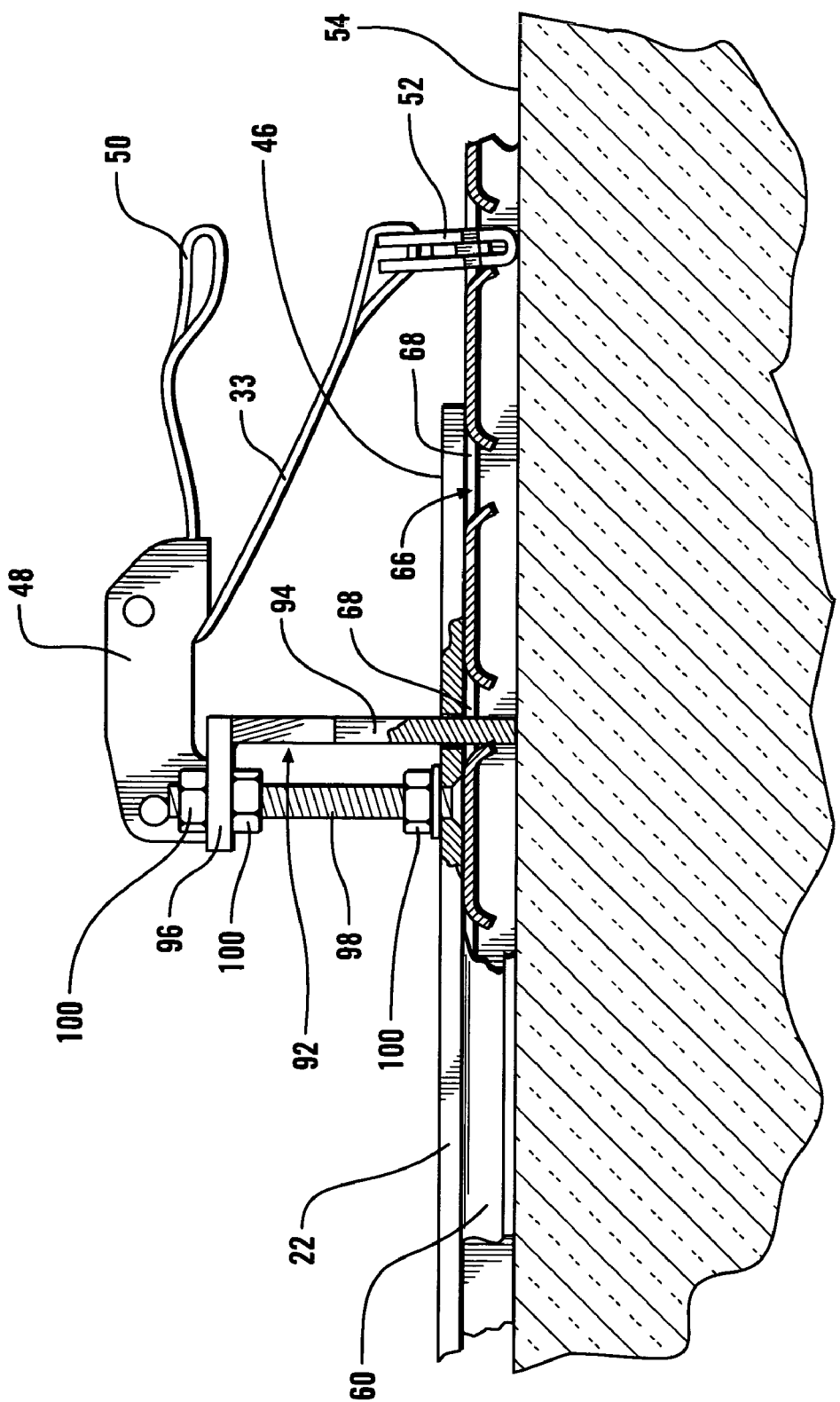
FIG. 7 is a side view of another embodiment of the invention with a cut away section in cross section showing engagement of an "L" shaped mounting key with the logistic track.

Another embodiment of the present invention shown in FIG. 7 replaces the cam block 44 and key 42 of the embodiment of FIG. 1, located on the front end 46 of the mounting plate 22, with a single mounting key 92. As shown in FIG. 7, the mounting key 92 preferably has an "L" shape. The long element 94 of the "L" shaped mounting key 92 extends through the mounting plate 22, and has a transverse dimension only slightly less than the transverse length of the logistic track opening 66 to function just as the keys 42 above. The short element 96 of the "L" shaped mounting key 92 is positioned above and generally parallel to the top surface of the mounting plate 22 preferably by a pair of screws 98 extending upwardly from beneath the mounting plate 22 and threaded nuts 100 as shown in FIG. 7. The "L" shaped mounting key 92 functions like the cam block 44 above. The cam buckle 48 is secured to the top surface of the short element 96 and everything functions as in the embodiment shown in FIG. 1 and described above, except the "L" shaped mounting key 92 is secured to the surface of the mounting plate 22 as shown in FIG. 7 such that the long element 94 is restrained from moving in a direction transverse to the longitudinal axis of the logistic track 60. Of course, the mounting key 92 could also be in the form of a cam block similar to cam block 44, with a vertical key member extending downwardly from the modified cam block through the mounting plate 22 to function in the manner of the mounting key 92.

It is important to note that any holes in the mounting plate 22 for accepting fasteners that extend from the bottom surface 56 of the mounting plate 22 up through the plate should be countersunk so that the heads of any such fasteners are flush with or slightly recessed in the bottom surface 56 of the mounting plate 22. This allows the bottom surface 56 of the mounting plate 22 to rest flush on the surface of the logistic track 60 and the load surface 54 of the transporting vehicle 55 to thereby create a more stable mounting plate assembly 20 without protruding fastener hardware that might damage and deform the vehicle load surface 54. Further, it facilitates easy removal of the mounting plate assembly 20 since the bottom surface 56 will not have any fastener heads to snag or rub on the logistic track 60 or the load surface 54 of the transporting vehicle 55.

Additionally, any fasteners depicted in the drawings or described herein are standard commercially available fasteners. Any fastener appropriate for a specific function described in this specification may be used.

Furthermore, the logistic straps depicted in the drawings and described herein are standard in the cargo control systems industry. These straps are commercially manufactured and sold by many companies that manufacture and sell logistic track, fittings, and straps such as Kinedyne Corporation. It is important to note, however, that any tensioning means sufficient to secure the wheel chock mounting plate to a logistic track may be employed It is understood that the invention is not limited to the particular construction and arrangement of parts herein illustrated and described, but embraces all such modified forms thereof as come within the scope of the following claims.

What is claimed is:

1. A mounting plate assembly for mounting a wheel chock on the load surface of a transporting vehicle having an attached logistic track, the mounting plate assembly comprising:
   a mounting plate adapted to receive and secure a wheel chock thereto;
   a first fitting adapted to removably engage the logistic track at an opening therein, said first fitting attached to the rear of said mounting plate for securing said mounting plate to the logistic track in a longitudinal direction;
   at least one key extending beneath said mounting plate fitting into an opening in the logistic track to restrain movement of said mounting plate in a direction transverse to the longitudinal direction of the logistic track; and
   a second fitting adapted to removably engage the logistic track at an opening therein, said second fitting attached to the front of said mounting plate for securing said mounting plate to the logistic track in a longitudinal direction.

2. The mounting plate assembly of claim 1 further comprising a plurality of side spacer bars attached to the underside of said mounting plate such that said spacer bars will engage the load surface of the transporting vehicle to support said mounting plate at a level above the attached logistic track in stable relation.

3. The mounting plate assembly of claim 1 further comprising a wheel chock secured to the top surface of said mounting plate.

4. A mounting plate assembly for mounting a wheel chock on the load surface of a transporting vehicle having an attached logistic track, the mounting plate assembly comprising:
   a mounting plate adapted to receive and secure a wheel chock thereto;
   a first fitting adapted to removably engage the logistic track at an opening therein, said first fitting attached to the rear of said mounting plate for securing said mounting plate to the logistic track in a longitudinal direction;
   a first logistic strap having a first end fastened to the rear of said mounting plate and a second end affixed to said first fitting to secure said strap and said mounting plate thereto;
   at least one key extending beneath said mounting plate fitting into an opening in the logistic track to restrain movement of said mounting plate in a direction transverse to the longitudinal direction of the logistic track; and
   a second fitting adapted to removably engage the logistic track at an opening therein, said second fitting attached to the front of said mounting plate for securing said mounting plate to the logistic track in a longitudinal direction.

5. A mounting plate assembly for mounting a wheel chock on the load surface of a transporting vehicle having an attached logistic track, the mounting plate assembly comprising:
   a mounting plate adapted to receive and secure a wheel chock thereto;
   a first fitting adapted to removably engage the logistic track at an opening therein, said first fitting attached to the rear of said mounting plate for securing said mounting plate to the logistic track in a longitudinal direction;
   at least one key extending beneath said mounting plate fitting into an opening in the logistic track to restrain movement of said mounting plate in a direction transverse to the longitudinal direction of the logistic track;
   a second fitting adapted to removably engage the logistic track at an opening therein, said second fitting attached to the front of said mounting plate for securing said mounting plate to the logistic track in a longitudinal direction;
   a cam buckle attached to said mounting plate; and
   a second logistic strap deployed through said cam buckle having a first end affixed to said second fitting and a free end such that when said second fitting is engaged in the logistic track opening said free end may be pulled to increase tension in said second strap to thereby secure said mounting plate longitudinally to the logistic track.

6. The mounting plate assembly of claim 5 further comprising a cam block secured to said mounting plate, said cam buckle being attached to said cam block.

7. A mounting plate assembly for mounting a wheel chock on the load surface of a transporting vehicle having an attached logistic track, the mounting plate assembly comprising:
   a mounting plate adapted to receive and secure a wheel chock thereto;
   a first fitting adapted to removably engage the logistic track at an opening therein, said first fitting attached to the rear of said mounting plate for securing said mounting plate to the logistic track in a longitudinal direction;
   a plurality of longitudinally spaced keys extending beneath said mounting plate, each said key being adapted to fit into an opening of the logistic track and having a transverse length slightly less than the transverse length of the logistic track opening to thereby restrain movement of said mounting plate in a direction transverse to the longitudinal axis of the track; and
   a second fitting adapted to removably engage the logistic track at an opening therein, said second fitting attached to the front of said mounting plate for securing said mounting plate to the logistic track in a longitudinal direction.

8. The mounting plate assembly of claim 7 wherein said mounting plate contains at least one longitudinal slot for every said key such that a fastener can extend from the top of said mounting plate through said slot to attach said key to said mounting plate in a longitudinally slideable relation.

9. The mounting plate assembly of claim 8 further comprising spacer means longer than the thickness of said mounting plate associated with each said fastener for spacing said keys with respect to said mounting plate whereby said fasteners and said keys may slide longitudinally along the bottom of said mounting plate but are restrained from moving in a direction transverse to the longitudinal axis of said mounting plate.

10. A mounting plate assembly for mounting a wheel chock on the load surface of a transporting vehicle having an attached logistic track, the mounting plate assembly comprising:
   a mounting plate adapted to receive and secure a wheel chock thereto;
   a first fitting adapted to removably engage the logistic track at an opening therein, said first fitting attached to the rear of said mounting plate for securing said mounting plate to the logistic track in a longitudinal direction;

at least one key extending beneath said mounting plate fitting into an opening in the logistic track to restrain movement of said mounting plate in a direction transverse to the longitudinal direction of the logistic track;
a second fitting adapted to removably engage the logistic track at an opening therein, said second fitting attached to the front of said mounting plate for securing said mounting plate to the logistic track in a longitudinal direction, said second fitting comprising:
a first gripping plate being adapted to extend from above to beneath said mounting plate and having a notch on each side with lower facing edges capable of engaging the transverse margins of the logistic track which define an opening in the logistic track;
a second gripping plate having a lower key tab portion adapted to fit into an opening of the logistic track with a transverse dimension slightly less than that of the logistic track opening to thereby restrain movement of said mounting plate in a direction transverse to the longitudinal axis of the track such that said second gripping plate replaces one of the said keys, and further having a top portion with shoulder portions having facing edges capable of engaging the side transverse margins defining the logistic track opening, said second gripping plate having a surface abutting a surface of said first gripping plate in slideable relation, said mounting plate having a transverse slot through which said gripping plates are deployed; and
a means for applying a longitudinal force to said gripping plates to cause said gripping plates to form an angle with the logistic track to thereby cause the facing edges of said notches in said first gripping plate and said shoulders of said second gripping plate to engage the transverse margins of the logistic track which define an opening in the logistic track in fixed relation to secure said mounting plate to the logistic track.

11. The mounting plate assembly of claim 10 wherein said means for applying a longitudinal force to said gripping plates further comprises:
a socket joint attached to the front surface of said first gripping plate; and
a threaded rod rotationally mounted on said mounting plate and having a first end engageable in said socket joint, said threaded rod being rotateable to apply a longitudinal force to said socket joint to cause said gripping plates to form an angle with the logistic track to thereby cause said facing edges of said gripping plates to engage the transverse margins of the logistic track in fixed relation to secure said mounting plate to the logistic track.

12. The mounting plate assembly of claim 10 wherein one of said gripping plates contains a vertical slot and further comprising a retaining rod having a first end attached to the other said gripping plate and a second end passing through said slot in said one gripping plate and a spring compressed between the second end of said retaining rod and said one gripping plate to bias the abutting surfaces of said gripping plates together in a first position, and to permit said gripping plates to be separated and displaced vertically as said retaining rod is displaced vertically in said slot to a second position in which said key tab portion of said second gripping plate is located above said notches in said first gripping plate.

13. The mounting plate assembly of claim 12 further comprising a plurality of pins extending from one said gripping plate into locator holes in the other said gripping plate when said gripping plates are in said first position to limit the slideable movement of said first gripping plate with respect to said second gripping plate.

14. The mounting plate assembly of claim 13 wherein said second end of said retaining rod includes a removable head portion for retaining said spring in compressed relation between said head portion and the other said gripping plate.

15. A mounting plate assembly for mounting a wheel chock on the load surface of a transporting vehicle having an attached logistic track, the mounting plate assembly comprising:
a mounting plate adapted to receive and secure a wheel chock thereto; and
a first fitting adapted to removably engage the logistic track at an opening therein, said first fitting attached to the rear of said mounting plate for securing said mounting plate to the logistic track in a longitudinal direction;
at least one key extending beneath said mounting plate fitting into an opening in the logistic track to restrain movement of said mounting plate in a direction transverse to the longitudinal direction of the logistic track;
a second fitting adapted to removably engage the logistic track at an opening therein, said second fitting attached to the front of said mounting plate for securing said mounting plate to the logistic track in a longitudinal direction;
a mounting key fixedly attached to said mounting plate, said mounting key having an element that is deployed generally perpendicular to said mounting plate and extending through an opening in said mounting plate and adapted to fit into a logistic track opening located below said opening in said mounting plate to restrain movement of said mounting plate in a direction transverse to the longitudinal axis of said logistic track;
a cam buckle fastened to the top surface of said mounting key; and
a second logistic strap deployed through said cam buckle having a first end affixed to said second fitting and a free end such that when said second fitting is engaged in the logistic track opening said free end may be pulled to increase tension in said second strap to thereby secure said mounting plate longitudinally to the logistic track.

16. A mounting plate assembly for mounting a wheel chock on the load surface of a transporting vehicle, the mounting plate assembly comprising:
a mounting plate adapted to receive and secure a wheel chock thereto;
a logistic track fixed to the transporting vehicle and having a plurality of longitudinally spaced openings extending transverse to the longitudinal axis of said track;
a first fitting attached to the rear of said mounting plate and removably engaged in an opening of said logistic track to secure said mounting plate to said logistic track in a longitudinal direction;
at least one key extending beneath said mounting plate and fitting into a said track opening to restrain movement of said mounting plate in a direction transverse to the longitudinal axis of said track; and
a second fitting attached to the front of said mounting plate and removably engaged in an opening of said logistic track to secure said mounting plate to said logistic track in a longitudinal direction.

17. The mounting plate assembly of claim 16 further comprising a wheel chock secured to the top surface of said mounting plate.

18. A mounting plate assembly for mounting a wheel chock to the floor of a transporting vehicle, the mounting plate assembly comprising:

a mounting plate;

a wheel chock attached to the top surface of said mounting plate;

a logistic track attachable to the load surface of a transporting vehicle, said track having a plurality of longitudinally spaced openings extending transversely to the longitudinal axis of said track;

a first tension means for connecting the rear of said mounting plate to a first fitting adapted to engage said logistic track in fixed relation;

a plurality of longitudinally spaced keys extending beneath said mounting plate, each said key adapted to fit into a said opening of said logistic track and having a transverse length slightly less than the width of said logistic track opening to thereby restrain movement of said mounting plate in a direction transverse to said track; a second tension means having a first end affixed to a second fitting adapted to engage said logistic track in fixed relation; and a means for engaging and restraining said second tension means wherein when said first and second fittings are engaged in openings of said logistic track said second tension means may be pulled and restrained to increase tension in both said tension means to thereby secure said mounting plate longitudinally to said logistic track.

19. The mounting plate assembly of claim 18 wherein said mounting plate contains at least one longitudinal slot for every said key such that a fastener can extend from the top of said mounting plate through said slot to attach said key to the bottom of said mounting plate in slideable relation.

20. The mounting plate assembly of claim 19 further comprising a spacer associated with each fastener, said spacers being longer than the thickness of said mounting plate such that when the fasteners are tightened in engagement with said keys said spacers will extend through said slots in slideable relation to permit said keys to move longitudinally along the bottom of said mounting plate but be restrained from moving in a transverse direction to said mounting plate.

21. The mounting plate assembly of claim 18 further comprising a plurality of side spacer bars attached to said mounting plate such that said spacer bars will engage the load surface to support said mounting plate at a level above said logistic track in stable relation.

* * * * *